United States Patent Office 3,399,280
Patented Aug. 27, 1968

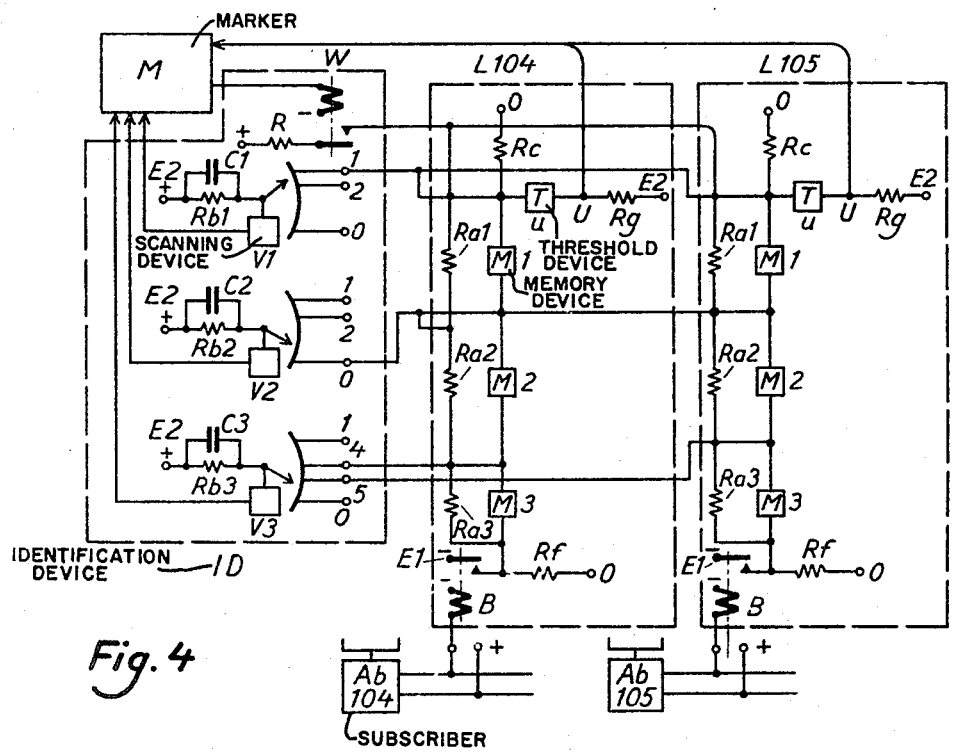
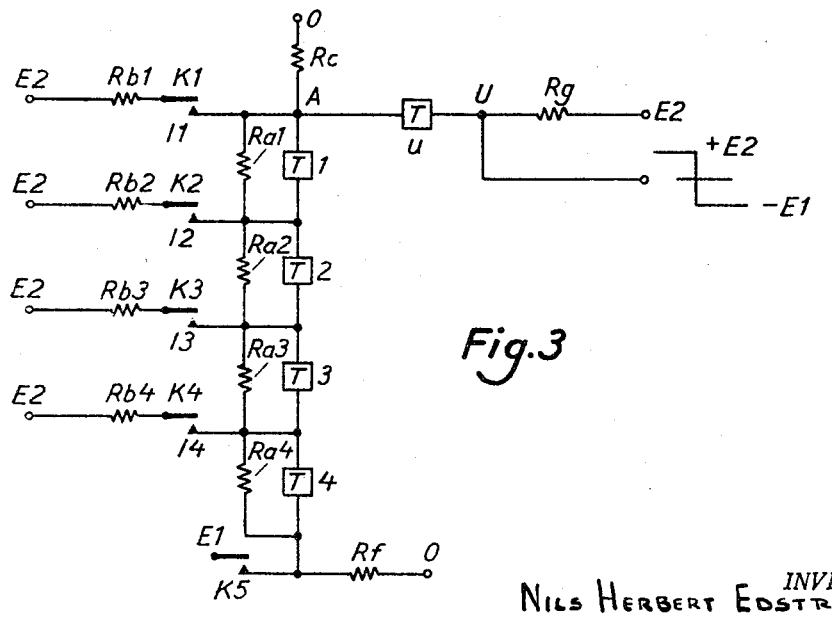

3,399,280
CIRCUIT IDENTIFYING MEANS FOR OBTAINING AN OUTLET SIGNAL IN DEPENDENCE ON A NUMBER OF INLET SIGNALS
Nils Herbert Edström, Vallingby, Sweden, assignor to Telefonaktiebolaget L. M. Ericsson, Stockholm, Sweden, a corporation of Sweden
Filed Oct. 27, 1965, Ser. No. 505,369
Claims priority, application Sweden, Nov. 19, 1964, 13,965/64
4 Claims. (Cl. 179—18)

The present invention concerns a circuit arrangement for obtaining a signal at an outlet in dependence on the reception in a predetermined sequential order of a number of inlet signals at an equal number of inlets.

Compared to the common and-circuits, at which a signal is obtained at an outlet in dependence on the simultaneous reception of an inlet signal at a number of inlets, it may be convenient for instance at certain applications in the telephone technics that an outlet signal can be obtained only provided the inlet signals are received in a predetermined sequential order. The object of the invention is to obtain such a circuit arrangement.

The circuit arrangement of the invention is principally characterized by a number of connection elements, corresponding to the number of inlets, which connection elements each one comprises a bi-directional semi-conductor current controlling device including a solid state semi-conductor material and electrodes coupling the same, which device from a high resistance state may be transformed into a low resistance state by the application of a voltage that exceeds a threshold voltage and which connection elements each one with a parallel resistance are connected in series as links in a chain with a resistance as extreme link at one end, said chain being connected between the terminals of a first voltage source, the voltage of which is lower than said threshold voltage, whereby all intermediate junction points of said links constitute the inlets of said circuit arrangement, said inlets being arranged for receiving a second voltage that, added to the voltage of said first voltage source, exceeds the threshold voltage, so that the connection elements may be transformed into low resistance state by the imposition of said second voltage at the inlets in turn and order counted from the other end of the chain until the whole chain of connection elements has become low resistant, and by a further connection element, the one terminal of which constitutes the outlet of the circuit arrangement which further connection element is connected between the last inlet and said second voltage that, added to the voltage of said first voltage source appearing at said last inlet at the low resistance state of all connection elements of the chain, exceeds the threshold voltage, so that said further connection element becomes conducting and changes the voltage condition of said outlet.

Figure 1:
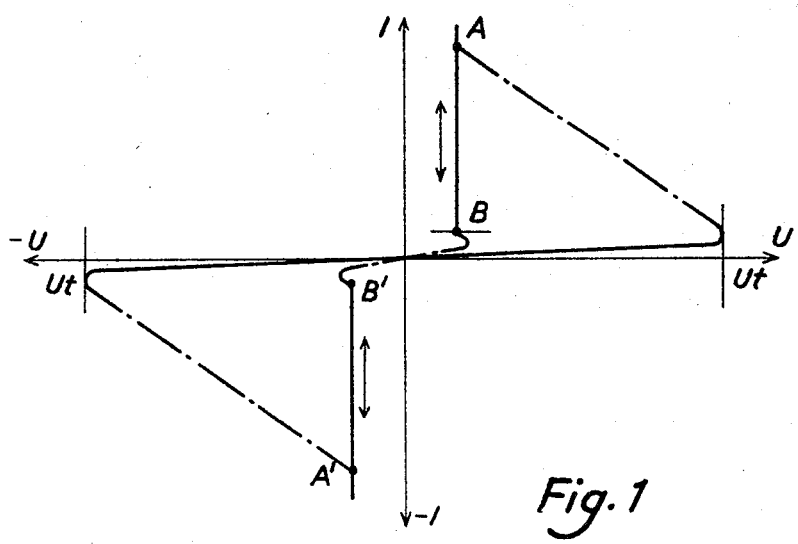
Figure 2:
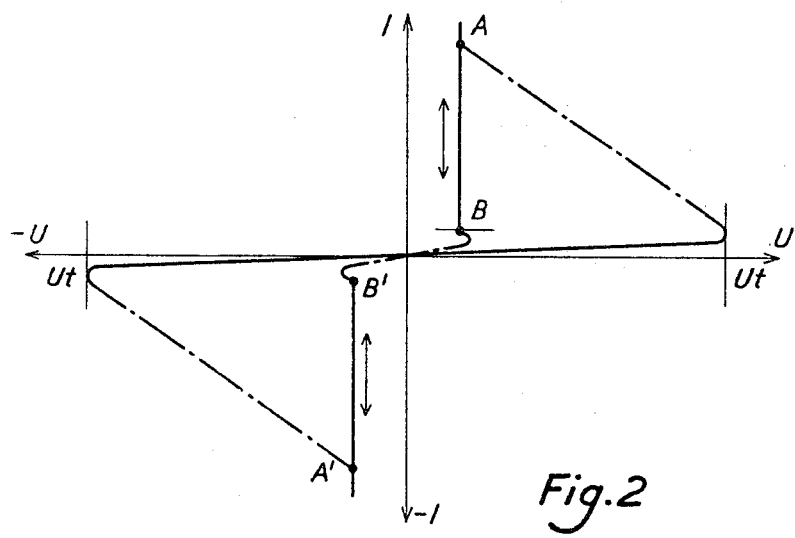

The invention will be further explained herebelow by means of a couple of embodiments with reference to the attached drawing, in which FIG. 1 is a voltage current characteristic for a connection element with memory properties, in the following called a "memory element," FIG. 2 is a voltage current characteristic of a connection element with a threshold function, in the following called "threshold element," FIG. 3 shows a circuit arrangement according to one embodiment of the invention and FIG. 4 shows another embodiment of the invention used in an identifier for subscriber's lines in an automatic telephone system.

The semi-conducting elements are normally in a high resistance state which may be explained by the fact that the semi-conducting material is in an amorphous state. Provided the current passes through the semi-conducting amorphous material with a sufficient current density, the element becomes conducting. The transformation from insulating into conducting state occurs when an ignition voltage of for instance 60–70 v., in dependence on the chemical composition of the material, is exceeded. In dependence on the chemical composition of the elements two different types may be recognized. At the one type, the voltage current characteristic of which is shown in FIG. 1, the conducting state may be maintained after the current has ceased or changed direction provided the current has been slowly reduced to 0-level. At a steep reduction of the current to 0-level the element again becomes high resistant, as is seen in FIG. 1. This element is the memory element.

FIG. 2 shows a voltage current characteristic for an element of the other type, at which the conducting state is maintained from the moment the element has been exposed to the threshold voltage until the current is reduced below a predetermined lower threshold value. Provided the current is reduced below this lower threshold value, the lower resistance state of the element is transformed into a high resistance state. This element, contrary to the first element, cannot maintain its low resistance state even if the current should be slowly decreased to 0. This element is the threshold element.

FIG. 3 shows a circuit arrangement according to one embodiment of the invention with four inlets I1 . . . I4 and an outlet U. It is desired to obtain an outlet signal in dependence on the reception of a signal at each one of the inlets. The arrangement includes a number of series connected threshold elements T1 . . . T4 corresponding to the number of inlets, which threshold elements in series with a resistance Rc are connectable through a contact K5 to the terminals of a voltage source giving a voltage E1. In parallel to each threshold element a resistance RA1–RA4 is connected and at each connection element the one junction point, located nearest to the series resistance Rc, constitutes an inlet of the circuit arrangement. The voltage E1 of the voltage source is lower than the threshold voltage of the elements. Each one of the inlets I1–I4 is provided with contacts K1–K4, the closing of which connects to the respective inlet a voltage E2 through resistances RB1–RB4. The level of the voltage E2 is so chosen that this voltage added to the voltage E1 will bring a threshold element to low resistant state. According to the example it may be supposed that E1 is −35 v. while E2 is +35 v. Naturally, these voltages can be of different values, E1 may be positive and E2 negative as the direction of the current is of no importance for the functioning of the elements. In the idle state all the threshold elements are high resistant, which signifies that, at the closure of the contacts K1–K3, no change will occur in the state of the threshold elements as long as the threshold element T4 is high resistant. If on the contrary the contact K4 is closed, a voltage of 70 v. will be applied to the threshold element T4, which voltage is sufficient to transform this element into low resistance state. Consequently, the voltage E1 will appear at the junction point of the elements T3 and T4, so that the threshold element T3 will be low resistant provided the contact K3 is closed. If the threshold element T3 becomes low resistant the junction point between the threshold elements T2 and T3 will receive the voltage E1 and thus all threshold elements may in this way be transformed into conducting state in said sequential order. Thus, it is understood that the signals have to be received in a predetermined sequential order to transform all the threshold elements into low resistant Considering that the threshold elements maintain their low resistance condition only as long as the current does not decrease below a predetermined lower threshold value, all the signals have to continue for a while, i.e. the contacts K1–K4 have to remtain closed.

If memory elements are used instead of threshold elements as is explained with reference to FIG. 4, the signals may be suspended as soon as the elements have been actuated. The junction point A between the series resistance Rc and the first threshold element T1 is connected through a further element Tu and a resistance Rg to a voltage, the value and polarity of which corresponds to the voltage E2 connectable to the inlets. The junction point U between the threshold element Tu and the resistance Rg constitutes the outlet of the circuit. In the idle condition of the circuit arrangement the threshold element Tu is high resistant, which signifies that the outlet U has the same potential as the voltage source E2. The point A has a negative voltage determined by the voltage division between the resistance Rc and the resistances Ra1–Ra4, which voltage however is insufficient, when added to the voltage E2, to make the threshold element Tu low resistant. When all the threshold elements T1–T4 are low resistant, so that the point A has practically the same potential as the voltage source E1, i.e. according to the example —35 v., the voltage across the threshold element Tu exceeds the threshold value and transforms the element into low resistance state. Consequently there will in the junction point U between the threshold elements Tu and the resistance Rg appear a negative voltage that signifies that all the inlets have been affected in a predetermined sequence order.

FIG. 4 shows an application of the invention in an identifier for 1000 lines in an automatic telephone system. To every subscriber's line corresponds an and-circuit according to the invention, of which however only two, L104, L105, are shown in the figure. At a call the subscriber's line relay B is operated and connects the voltage source E1 to the and-circuit. The outlets of the and-circuits can in the same way as in the device of FIG. 3 be changed from one voltage value to another voltage value and the only difference is that memory elements are used instead of threshold elements, which signifies that added to the negative voltage E1, connected to the taneously, as the elements retain their low resistance state independently of whether the inlet signal remains or not. This, however, does not signify that it is absolutely necessary in the shown telephone application to use memory elements; it is possible as well to use threshold elements as shown in FIG. 3. The identification device ID comprises three scanning devices V1–V3 corresponding to the units, tens and hundreds digits of the identification number. The scanning devices test each 10 conductors in turn and order connecting to them the positive voltage E2 that added to the negative voltage E1, connected to the activated and-circuit, exceeds the threshold voltage of the memory elements. In each subscriber's line equipment each inlet is connected to one of the conductors in the scanning device belonging to the respective digit weight. The scanning device is stopped as soon as the memory element in anyone of the subscriber's line equipments has become low resistant and thus makes possible the passing of the current. The scanning device transfers to the marker the information of the position in which it has stopped, for instance the information that the scanning device V3 has stopped in the position nr 4 if the call comes from the subscriber L104, in which case the memory element M3 becomes conducting. Now the connection element M2 may become conducting at the test movement of the scanning device V2 when the voltage E2 is connected to the wire O, whereby also this scanning device is stopped and information is sent to the marker. Thereafter the subsequent scanning device V1 corresponding to the hundreds digit brings the memory element M1 to low resistance state when it connects the voltage E2 to the conductor corresponding to the subscriber's line equipment having the hundreds digit 1. When all three scanning devices have been stopped, the marker has the information regarding the subscriber's identity simultaneously as the outlet of the subscriber's line equipment is marked by a change in polarity showing that the identification has been terminated. By this the marker is called upon for connection and, having received the identification information from the scanning devices V1–V3, it can set up the connection in the known way. At calls eventually occurring simultaneously it is important that by the sequential activation of the connection elements a mixing up of the identification information is avoided.

As is mentioned in relation to FIGS. 1 and 2 it is important in order to transform the memory elements into low resistance state that the current should decrease slowly after having reached the threshold voltage. This is obtained by means of RC-circuits, connected between the voltage E2 and the memory elements. As a consequence of the charging of the condenser the current will decrease slowly after having reached the threshold voltage. The transformation of the memory elements into high resistance state is carried out as earlier mentioned by means of a current impulse with steep rear flank which is obtained by the marker momentarily closing and opening a contact, for instance by means of a relay W. This will occur when the identification and the setting up of the connection is terminated. Thereafter the memory element is again high resistant and the identification of the next calling subscriber may be carried out. As earlier mentioned there is no obstacle to use threshold elements for the identification provided measures are taken to avoid that the current imposed on the threshold element is reduced below a lower threshold value. By the use of memory elements the advantage is obtained that at a current failure the state is maintained unchanged, a fact that also is of importance if the circuit according to the invention is used in connection with a computer controlled process.

I claim:

1. Circuit arrangement for obtaining a signal at an outlet in dependence on the reception of inlet signals in a predetermined sequential order at each one of a number of inlets, comprising a number of connection elements corresponding to said number of inlets, each said connection element comprising a bi-directional semi-conductor current controlling device including a solid state semi-conductor material and electrodes for coupling the same in a circuit, said solid state semi-conductor material in one state having at least portions thereof between the electrodes in one structural state which is of high resistance and substantially an insulator for blocking the flow of current therethrough in either or both directions, when an applied voltage is below an upper threshold voltage, and in another state having at least portions thereof between the electrodes in another structural state which is of low resistance and substantially a conductor for conducting the flow of current therethrough in either or both directions when the applied voltage is raised above said upper threshold voltage level and then remains above a lower threshold voltage level, said at least portions of said solid state semi-conductor material being controlled and substantially instantaneously changed from said one blocking structural state to said other conducting structural state by the imposition of a transient voltage of any polarity above said upper threshold voltage level and reverted to said blocking structural state when the current therethrough reduces substantially to zero, said connection elements, each one provided with a parallel resistance, being connected in series as links in a chain with a resistance as extreme link at one end of said chain, said chain being connected between the terminals of a first voltage source the voltage of which is lower than said upper threshold voltage, all intermediate junction points of said links constituting the inlets of said circuit arrangement, said inlets being arranged for receiving a second voltage that, added to the voltage of said first voltage source, exceeds the threshold voltage so that the connection elements may be transformed into low resistance state by the imposition of said second voltage at the inlets in turn and order counted from the other end of the chain, until the whole chain of connection elements has become low resistant, and a further connection element, equal to said connection elements, the one terminal of which constitutes the outlet of said circuit arrangement, said further connection element being connected between the last inlet and the source of said second voltage that, added to the voltage of said first voltage source appearing at said last inlet at the low resistance state of all connection elements of the chain, exceeds the threshold voltage of said further connection element to bring the same to conducting state thereby changing the voltage condition of said outlet.

2. A circuit arrangement for obtaining a signal at an outlet, in dependence on the reception of inlet signals in a predetermined sequential order at each one of a number of inlets, comprising a number of connection elements corresponding to said number of inlets, each said connection element comprising a bi-directional semi-conductor current controlling device including a solid state semi-conductor material, and electrodes for coupling the same in a circuit, said solid state semi-conductor material in one state having at least portions thereof between the electrodes in one structural state which is of high resistance and substantially an insulator for blocking the flow of current therethrough in either or both directions, when an applied voltage is below an upper threshold voltage and in another state having at least portions thereof between the electrodes in another structural state which is of low resistance and substantially a conductor for conducting the flow of current therethrough in either or both directions when the applied voltage is raised above said upper threshold voltage level, said at least portions of said solid state semi-conductor material being controlled and substantially instantaneously changed from said one blocking structural state to said other conducting structural state by the imposition of a transient voltage of any polarity above said upper threshold voltage level and reverted to said blocking structural state by a current pulse therethrough with a steep rear flank, said connection elements, each one provided with a parallel resistance being connected in series as links in a chain with a resistance as extreme link at one end of said chain, said chain being connected between the terminals of a first voltage source, the voltage of which is lower than said upper threshold voltage, all intermediate junction points of said links constituting the inlets of said circuit arrangement, said inlets being arranged for receiving a second voltage that, added to the voltage of said first voltage source, exceeds the threshold voltage so that the connection elements may be transformed into low resistance state by imposition of said second voltage at the inlets in turn and order counted from the other end of the chain until the whole chain of connection elements has become low resistant, and a further connection element comprising a bi-directional semi-conductor current controlling device including a solid state semi-conductor material and electrodes for coupling the same in a circuit, said solid state semi-conductor material in one state having at least portions thereof between the electrodes in one structural state which is of high resistance and substantially an insulator for blocking the flow of current therethrough in either or both directions, when an applied voltage is below an upper threshold voltage, and in another state having at least portions thereof between the electrodes in another structural state which is of low resistance and substantially a conductor for conducing the flow of current therethrough in either or both directions when the applied voltage is raised above said upper threshold voltage level and then remains above a lower threshold voltage level, said at least portions of said solid state semi-conductor material being controlled and substantially instantaneously changed from said one blocking structural state to said other conducting structural state by the imposition of a transient voltage of any polarity above said upper threshold voltage level and reverted to said blocking structural state when the current therethrough reduces substantially to zero, the one terminal of said connection element constituting the outlet of said circuit arrangement, said further connection element being connected between the last inlet of the source of said second voltage that, added to the voltage of said first voltage source appearing at said last inlet at the low resistance state of all connection elements of the chain, exceeds the threshold voltage of said further connection element to bring same to conducting state thereby changing the voltage condition of said outlet.

3. Identification device for subscriber's lines in an automatic telephone system, comprising a plurality of circuit arrangements according to claim 1, each circuit arrangement corresponding to a determined subscriber's line, the circuit arrangements being each provided with a means for connecting the same to said first voltage source at a call from the subscriber, each connection element in said chain of each circuit arrangement corresponding to a digit of the subscriber's identification number, each inlet of the circuit arrangement thus corresponding to a determined digit weight, to each said inlet being connected one wire out of the ten wires corresponding to the units within said digit weight, said ten wires being connected to a scanning device corresponding to the respective digit weight, said scanning device being arranged to connect in turn and order to each of said ten wires said second voltage to make the connection elements of the circuit arrangement of a calling subscriber's line low resistant in turn and order, the circuit being such that current through each low resistant connection element through the corresponding wire causes stopping of the scanning device on said wire to identify the identification number of the subscriber's line by the individual position of each scanning device at the appearance of a signal at said outlet.

4. Identification device for subscriber's line in an automatic telephone system, comprising a plurality of circuit arrangements according to claim 2, each circuit arrangement corresponding to a determined subscriber's line, the circuit arrangements being each provided with a means for connecting the same to said first voltage source at a call from the subscriber, each connection element in said chain of each circuit arrangement corresponding to a digit of the subsciber's identification number, each inlet of the circuit arrangement thus corresponding to a determined digit weight, to each said inlet being connected one wire out of the ten wires corresponding to the units within said digit weight, said ten wires being connected to a scanning device corresponding to the respective digit weight, said scanning device being arranged to connect in turn and order to each of said ten wires said second voltage to make the connection elements of the circuit arrangement of a called subscriber's line low resistant in turn and order, the circuit being such that current through each low resistant connection element through the corresponding wire causes stopping of the scanning device on said wire to identify the identification number of the subscriber's line by the individual position of each scanning device at the appearance of a signal at said outlet.

References Cited

UNITED STATES PATENTS

| 2,724,018 | 11/1955 | Pouliart et al. | 179—18.61 |
|---|---|---|---|
| 3,271,591 | 9/1966 | Ovshinsky | 307—88.5 |
| 3,278,687 | 10/1966 | Everett | 179—18.61 |

KATHLEEN H. CLAFFY, *Primary Examiner.*

LAURENCE WRIGHT, *Assistant Examiner.*